I
US009890737B2

(12) United States Patent
Wuest et al.

(10) Patent No.: US 9,890,737 B2
(45) Date of Patent: Feb. 13, 2018

(54) CYLINDER HEAD ASSEMBLY

(71) Applicant: Dr. Ing. h.c. F. Porsche Aktiengesellschaft, Stuttgart (DE)

(72) Inventors: Johannes Wuest, Bietigheim-Bissingen (DE); Maximilian Fischer, Tamm (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 95 days.

(21) Appl. No.: 14/882,578

(22) Filed: Oct. 14, 2015

(65) Prior Publication Data
US 2016/0108849 A1 Apr. 21, 2016

(30) Foreign Application Priority Data
Oct. 16, 2014 (DE) .................. 10 2014 115 093

(51) Int. Cl.
*F02B 3/06* (2006.01)
*F02F 1/24* (2006.01)
*G01J 5/10* (2006.01)
*F02B 77/08* (2006.01)
*F01L 3/24* (2006.01)
*F02B 1/04* (2006.01)
*F02F 1/42* (2006.01)
(Continued)

(52) U.S. Cl.
CPC .................. *F02F 1/24* (2013.01); *F01L 3/24* (2013.01); *F02B 77/086* (2013.01); *G01J 5/10* (2013.01); *F01L 2009/0473* (2013.01); *F01L 2013/116* (2013.01); *F02B 1/04* (2013.01); *F02B 3/06* (2013.01); *F02F 1/38* (2013.01); *F02F 1/4214* (2013.01); *F02F 2001/245* (2013.01)

(58) Field of Classification Search
CPC ......... F02F 2001/245; F02F 1/38; F02B 1/04; F02B 3/06
USPC ........................................ 123/193.5
See application file for complete search history.

(56) References Cited

U.S. PATENT DOCUMENTS 4,444,043 A * 4/1984 Hattori .................. G01L 23/16
73/114.09
4,836,689 A 6/1989 O'Brien
(Continued)

FOREIGN PATENT DOCUMENTS

DE 35 38 066 4/1986
DE 196 16 744 11/1997
(Continued)

OTHER PUBLICATIONS

English Translation of Korean Office Action.
Guenter P. Merker et al.—Grundlagen Verbrennungsmortoren—2011—pp. 363-375.
German Search Report dated Jun. 29, 2015.

*Primary Examiner* — Jacob Amick
*Assistant Examiner* — Charles Brauch
(74) *Attorney, Agent, or Firm* — Gerald E. Hespos; Michael J. Porco; Matthew T. Hespos

(57) ABSTRACT

A cylinder head assembly for an internal combustion engine has a housing (12) in which a plurality of elements (18, 44) are arranged. An optical duct (24) is formed in the housing (12) and is assigned to at least one of the elements (18). The optical duct (24) is assigned an infrared detector (28) that is designed to detect infrared radiation (30) from the at least one element (18) through the optical duct (24) to determine a temperature (T) of the at least one element (18).

11 Claims, 4 Drawing Sheets

(51) Int. Cl.
   *F02F 1/38*   (2006.01)
   *F01L 13/00*   (2006.01)
   *F01L 9/04*   (2006.01)

(56) References Cited

U.S. PATENT DOCUMENTS

| | | | | |
|---|---|---|---|---|
| 5,086,348 | A * | 2/1992 | Le Roy | H04Q 11/0478 |
| | | | | 398/2 |
| 7,987,712 | B2 | 8/2011 | Myhre | |
| 2006/0091303 | A1* | 5/2006 | Evans | G01N 21/0303 |
| | | | | 250/227.25 |
| 2010/0140373 | A1 | 6/2010 | Myhre | |
| 2010/0230598 | A1* | 9/2010 | Moonen | F01L 3/20 |
| | | | | 250/341.6 |

FOREIGN PATENT DOCUMENTS

| | | | |
|---|---|---|---|
| EP | 0708318 | A1 | 4/1996 |
| JP | H3500205 | A | 1/1991 |
| JP | H861115 | A | 3/1996 |
| JP | H1075934 | A | 3/1998 |
| JP | 2004219216 | A | 8/2004 |
| JP | 2005330833 | A | 12/2005 |
| JP | 2009-144659 | | 7/2009 |
| JP | 2010139503 | A | 6/2010 |
| JP | 2007291941 | A | 11/2011 |
| WO | 91/13248 | | 9/1991 |

* cited by examiner

CYLINDER HEAD ASSEMBLY

CROSS REFERENCE TO RELATED APPLICATION

This application claims priority under 35 USC 119 to German Patent Appl. No. 10 2014 115 093.7 filed on Oct. 16, 2014, the entire disclosure of which is incorporated herein by reference.

BACKGROUND

1. Field of the Invention

The invention relates to a cylinder head assembly for an internal combustion engine. The cylinder head assembly has a housing, a plurality of elements arranged in the housing and an optical duct formed in the housing and assigned to at least one of the elements. The invention also relates to a method for measuring a temperature of an element of a cylinder head assembly of an internal combustion engine. The invention further relates to an internal combustion engine that has an engine block which has at least one cylinder and one piston.

2. Description of the Related Art

Legal regulations and customer requirements in the field of automotive engineering have led to internal combustion engines with lower consumption and increased specific engine power. Increased power densities bring about an increased thermal energy that is discharged as waste heat from the combustion chamber into the cooling system and the surroundings. This increased discharging of heat also causes an increased thermal loading of many components of the internal combustion engine. As a result, elements such as pistons, valves, cylinder head, exhaust gas manifold and turbocharger experience an increased thermal loading.

The increasing thermal loading usually is counteracted by increased cooling, structural measures and the use of higher quality materials to ensure the reliability of the engines. In this context, structural measures are generally more cost-effective, and higher quality materials are more expensive, but entail lower structural complexity.

The development of internal combustion engines therefore requires the heating of certain elements, such as valves, during real operation of the engine to be taken into account to avoid exceeding specific temperature limits. Any structural change can change the temperature of certain components during operation. Hence, the temperature of certain elements must be determined continuously in the development phase.

The temperatures of valves and certain other elements during the real operation of the engine often are determined by using materials that experience a change in material hardness as a function of temperature so that conclusions to be drawn about the operating temperatures. Thermal elements also may be integrated into certain elements of the internal combustion engine to measure temperature distributions during operation. These methods are not ideal in that the temperature measuring range is small, the measuring accuracy is low and the technical expenditure on measuring the temperature is high. Additionally, the temperature measurement can, under certain circumstances, not take place under real conditions. As a result, there is uncertainty with respect to the measured operating temperatures.

The object of the invention therefore is to provide a cylinder head assembly and a method that enables the temperature of an element to be measured precisely under real conditions.

SUMMARY

The invention relates to a cylinder head with an optical duct disposed to receive infrared radiation from at least one element of the cylinder head. The invention also provides an infrared detector to detect infrared radiation from the optical duct to determine a temperature of the element. The invention also relates to a method that detects infrared radiation of an element of the cylinder head assembly is transmitted through an optical duct. The optical duct is formed in a housing of the cylinder head assembly, and the temperature of the at least one element is determined on the basis of the infrared radiation.

The infrared radiation of the element of the cylinder head assembly that is to be measured is detected by the infrared detector through the optical duct. Thus, the temperature can be determined in a contactless fashion. As a result, there is no need to restructure the element to be measured, and the temperature can be measured under real conditions. In addition, the pyrometric measurement provides a high level of accuracy over a large temperature range so that precise the temperature of the element of the cylinder head assembly can be measured precisely.

The optical duct may be a linear duct with one axial end that has an opening assigned to the at least one element. As a result, the infrared radiation of the at least one element can be detected precisely without infrared radiation from other components of the cylinder head assembly influencing the measurement.

A transparent sealing element may be arranged in the optical duct to seal the infrared sensor in a gas-tight fashion with respect to the at least one element. As a result, elements of the cylinder head assembly that are in a region with heavily fluctuating pressures, such as exhaust gas ducts, can be measured with little technical expenditure.

An optical element that is designed to focus the infrared radiation may be assigned to the infrared detector. As a result, the measuring accuracy can be improved, since the infrared radiation is focused onto the infrared detector.

The optical element may be arranged in the optical duct. As a result, the measurement and the focusing of the infrared radiation can take place near the element to be measured so that the measurement becomes more precise.

The optical duct may be connected to a gas duct of the cylinder head assembly to detect the temperature of the at least one element in the gas duct. As a result, it is possible to measure a particularly temperature-critical region of the cylinder head assembly that otherwise could be measured only indirectly or with very high expenditure.

The at least one element may be a valve of the cylinder head assembly. As a result, a particularly temperature-critical, movable element of the cylinder head assembly can be measured precisely so that optimum development is possible.

A measuring spot of the infrared detector may be positioned through the optical duct in such a way that infrared radiation is detected, for example, by a hollow groove in the valve. As a result, a particularly critical region of the valve can be measured and taken into account in structural measures for reducing the temperature.

The infrared detector may be connected optically to the optical duct by an optical waveguide. Thus, the infrared detector can be installed separately from the cylinder head assembly, and the entire measuring setup is insensitive to thermal loading and dirt.

The optical waveguide may be arranged at least in the optical duct and measured. As a result, the infrared measurement will not be disrupted.

The optical duct may be a linear tube with a gas-tight and fluid-tight lateral surface. Thus, the optical duct can be arranged in the cylinder head through spaces for oil and/or cooling water. As a result, infrared measurement is possible at positions in the cylinder head that are difficult to access.

An internal surface of the optical duct may have a dark and/or matt coating to avoid optical reflections in the optical duct.

Overall, the cylinder head assembly according to the invention with the optical duct for infrared measurement at any development time permits precise measurement of the temperature of certain elements of the cylinder head assembly. As a result, continuous checking of the thermal loading of the elements of the cylinder head is possible. Temperature measurements carried out by infrared measurement enable large temperature ranges and high absolute temperatures to be sensed without an increased structural expenditure of the corresponding elements to be measured. Finally, the infrared measurement can conduct real measurement during operation of the engine so that checking of the thermal properties is possible under conditions close to reality.

Of course, the features that are mentioned above and those that are still to be explained can be used not only with respect of the specified combination but also in other combinations or alone without departing from the scope of the invention.

Exemplary embodiments of the invention are illustrated in the drawings and will be explained in more detail in the following description.

DETAILED DESCRIPTION

Figure 1:
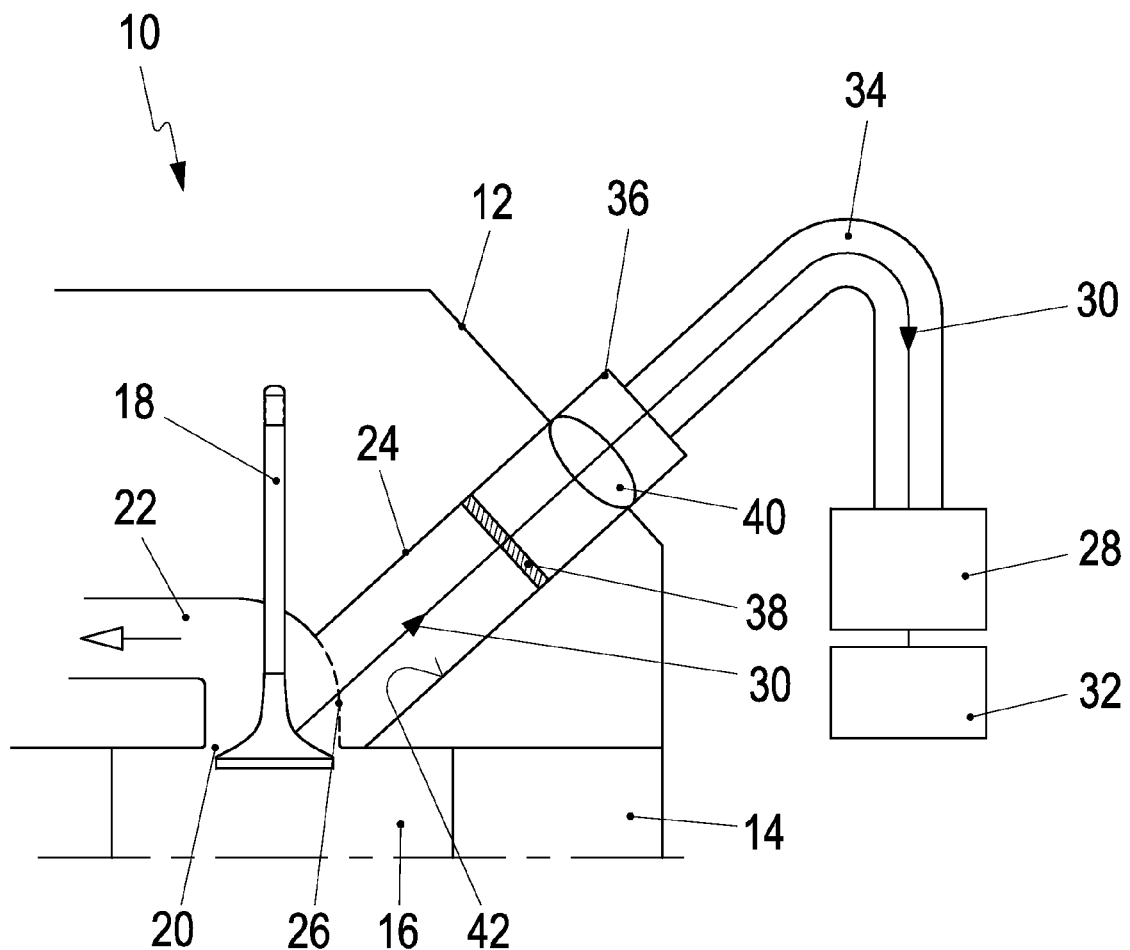
FIG. 1 is a schematic illustration of a cylinder head assembly with an infrared measuring device for measuring temperatures.

FIG. 1 is a partial schematic view through a cylinder head assembly that is denoted generally by 10. The cylinder head assembly has a housing 12 that bounds the cylinder head assembly 10 from the outside, and a multiplicity of elements of the cylinder head assembly 10 that heat up during operation are accommodated in the housing 12.

The cylinder head assembly 10 is connected to an engine block 14 that is illustrated merely schematically in a partial view in FIG. 1. The engine block 14 has at least one cylinder 16.

The cylinder head assembly 10 has a multiplicity of valves that cyclically open and close a combustion chamber of the cylinder 16 to feed combustion gas to the cylinder 16 or to discharge exhaust gas from the cylinder 16. FIG. 1 is a schematic illustration of a valve 18 as an outlet valve of the cylinder 16. The valve 18 closes an outlet opening 20 that connects the cylinder 16 to an outlet duct 22.

The high power densities of modern internal combustion engines results in high thermal loading, in particular of the outlet valves. As a result, the real operating temperature of the outlet valves has to be measured regularly during the development phase of internal combustion engines, in particular of cylinder head assemblies, to avoid excessively high thermal loading during operation of the end product.

In FIG. 1, the cylinder head assembly 10 also has an optical duct 24 that is formed in the housing 12 and has an opening 26 assigned to the valve 18. The optical duct 24 is connected optically to an infrared detector 28. Thus, infrared radiation 30 that is irradiated by the valve 18 is detected through the optical duct 24. The infrared detector 28 is connected to a control unit 32 that is designed to control the infrared detector 28 and to determine a temperature of the valve 18 on the basis of the detected infrared radiation 30.

The optical duct 24 of FIG. 1 is connected to the infrared detector 28 by a glass fiber cable 34 to feed the infrared radiation 30 to the infrared detector 28. The glass fiber cable 34 is connected to an end 36 of the optical duct 24 opposite the opening 26 to the optical duct 24 to receive and pass on the infrared radiation 30.

In an alternate embodiment, the infrared detector 28 is arranged directly at the end 36 of the optical duct or in the optical duct 24 to detect the infrared radiation directly in or on the optical duct 24.

A glass element 38 is arranged in the optical duct 24 and protects the infrared sensor 28 and/or the glass fiber cable 34 against high exhaust gas temperatures and soot particles in the outlet duct 22 and the corresponding exhaust gas counterpressure. The glass element 38 preferably is sapphire glass. A focusing element 40 also is arranged in the optical duct 24 to focus the infrared radiation 30 and feed the focused infrared radiation 30 to the glass fiber cable 34 and/or the infrared detector 28.

The optical duct 24 is linear duct and defines an elongated cylindrical tube with a lateral surface that is gas-tight and fluid-tight to seal the optical duct 24 from the surroundings. As a result, the optical duct 24 can be led through existing oil systems or cooling water systems of the cylinder head assembly 10 without oil or cooling water passing into the optical duct 24. The optical duct 24 preferably is welded to the outlet duct 22.

The optical duct 24 is oblique to a directional movement of the valve 18 to permit measurement of a hollow groove of the valve 18. In this context, the optical duct 24 and the opening 26 are oriented so that the infrared radiation 30 is directed into the optical duct 24 by a measuring spot of the valve 18, and the measuring spot is formed correspondingly on a section of the valve 18 to be measured.

An internal surface 42 of the optical duct 24 and the measuring object and the surroundings thereof can be provided with a black or dark coating and/or with a matt coating to avoid reflections on the internal surface 42 and the surfaces of the measuring object and the surroundings thereof.

The optical duct 24 and the infrared detector 28 of the cylinder head assembly 10 enable the temperature of the valve 18 to be detected reliably and precisely during operation of the engine. Of course, the measuring arrangement with the optical duct 24 and the infrared detector 28 is possible for measuring temperatures of other elements in the cylinder head assembly 10.

Figure 2:
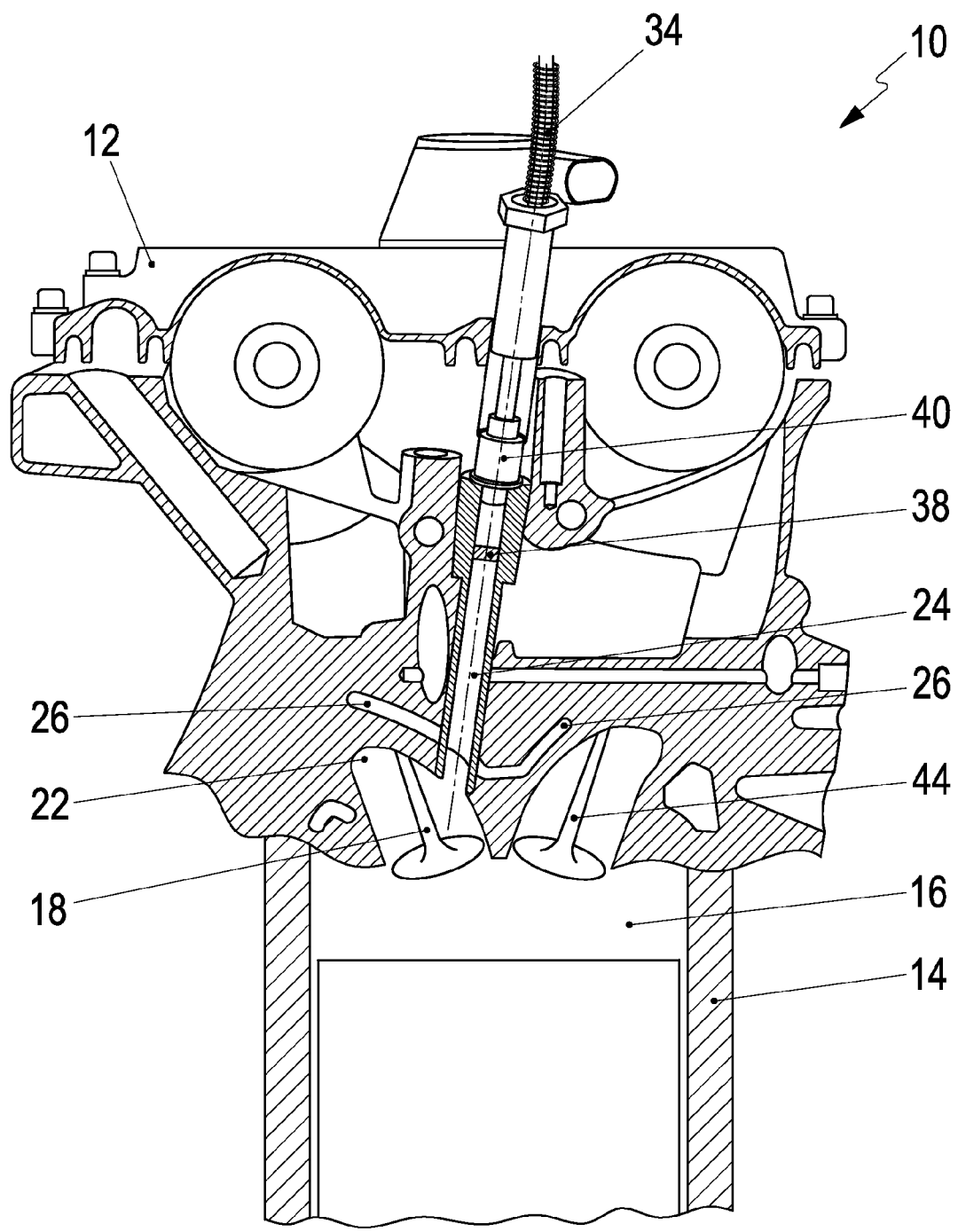
FIG. 2 is a perspective sectional view through a cylinder head assembly of an internal combustion engine with an optical duct for infrared temperature measurement.

FIG. 2 is a schematic perspective sectional view through the cylinder head assembly 10 with the engine block 14. The same elements are denoted by the same reference symbols with only the particular features explained here. The valve 18 of FIG. 2 is an outlet valve, and a valve 44 is illustrated as an inlet valve for the cylinder 16. The optical duct 24 is guided through the housing 12 of the cylinder head assembly 10. As a result, the opening 26 ends in the outlet duct 22, and infrared radiation 30 from the valve 18 can be directed through the opening 26 and the optical duct 24 to the infrared detector 28, which is not illustrated here. The optical duct 24 is a cylindrical tube and is guided through, for example, a water jacket 26 of the cylinder head assembly 10. The cylindrical tube that forms the optical duct 24 is welded to the outlet duct 22, with the result that an interior of the outlet duct is sealed, for example with respect to the water jacket 46. The glass element 38 is arranged in the optical duct 24 at a distance in the axial direction from the opening 26, with the result that the thermal loading of the glass element 38 is reduced and at the same time the glass element is protected against soot particles. Therefore continuous precise measurement is possible through the glass element 38.

The glass fiber cable 34 is connected via the focusing element 40 to the cylindrical tube that forms the optical duct 24 to direct the infrared radiation 30 to the infrared detector 28. Thus, the infrared detector 28 can be arranged separately from the housing 12 and is protected against thermal loading and dirt and the like.

Measurement of the temperature of the valve 18 through the optical duct 24 enables the measurement to be carried out at any desired cylinder head assemblies. This contactless measurement also makes precise measurement of high temperature gradients possible.

The control unit 32 also is connected to a controller of the valves 18, 44 to detect the valve stroke and to relate it to the detected temperature.

Figure 3:
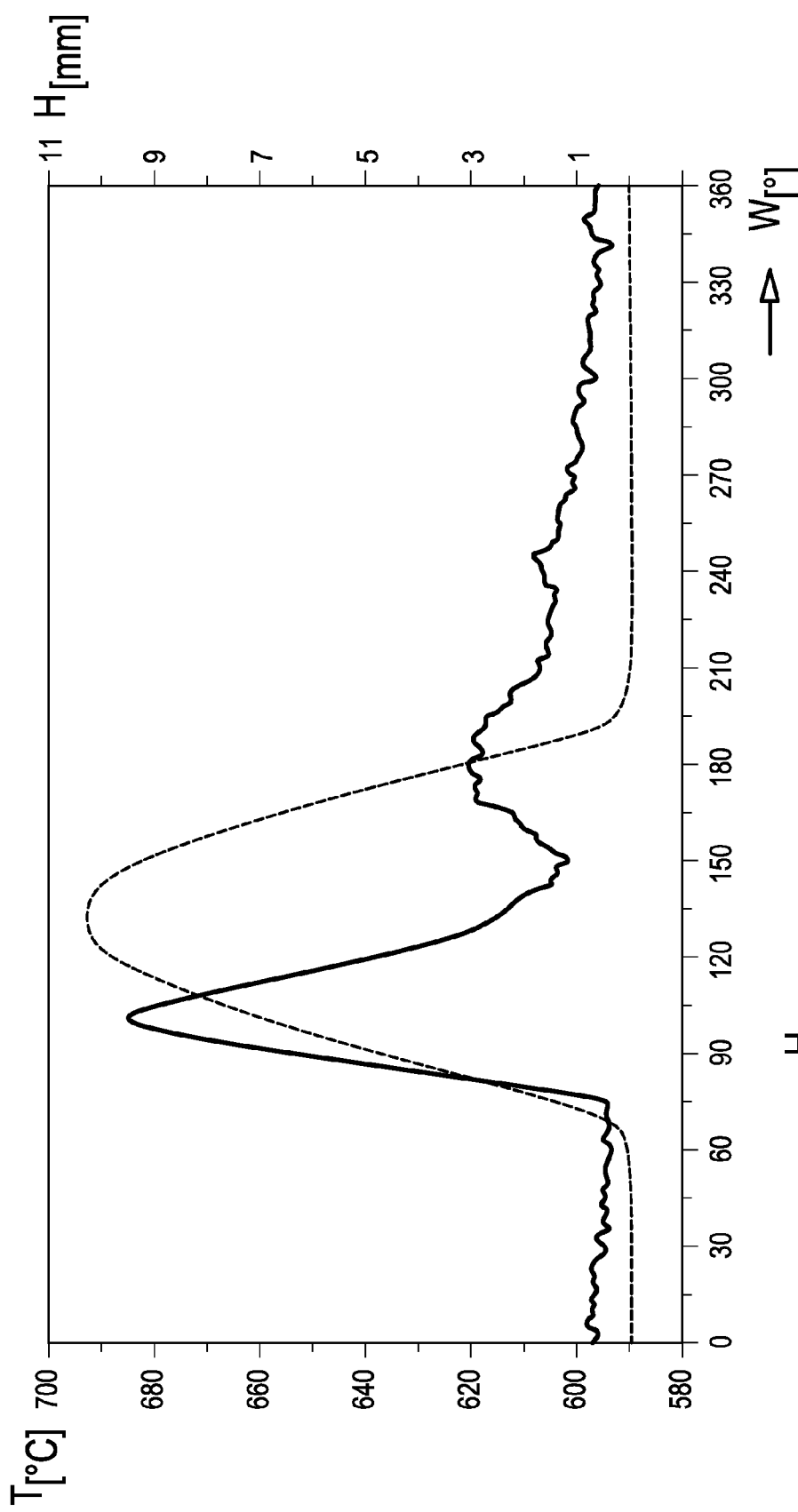
FIG. 3 shows a temperature profile of a valve of a cylinder head assembly during a valve cycle.

The temperature T detected by the infrared detector 28 of the valve 18 is shown in FIG. 3 over a valve cycle, or a revolution of a camshaft, together with a valve stroke H. FIG. 3 illustrates that measuring by the infrared detector 28 enables strong temperature gradients to be measured at the start of the opening process of the valve 18, and high absolute temperatures of the valve 18 can be measured, thus permitting continuous detection of the thermal loading of the valves 18, 44. The high temperature gradients illustrated here can be measured by using the massless measuring method based on the infrared radiation 30.

Figure 4:
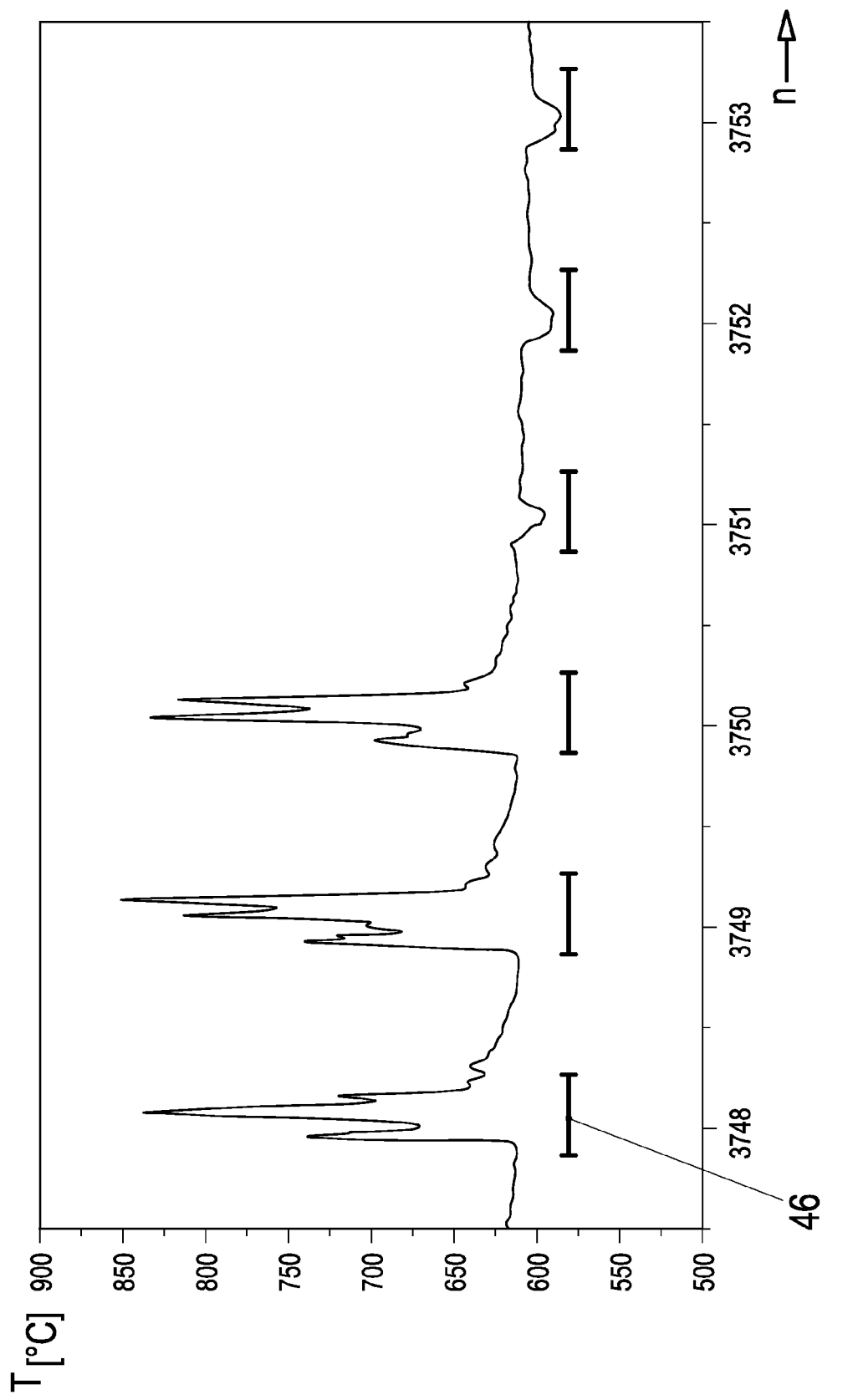
FIG. 4 shows a temperature profile of a valve of a cylinder head assembly during the transition from fired operation of the engine into overrun shutoff conditions.

FIG. 4 illustrates the detected temperature T of the valve 18 for six valve cycles, wherein a region in which the valve 18 is opened is indicated by a horizontal bar 46. In FIG. 4, the transition from fired engine operation during the first three valve cycles to overrun shutoff conditions of the three following valve cycles is shown. As is illustrated in FIG. 4, precise temperature detection can be carried out by infrared measurement so that even high temperature gradients can be measured during the fired operation of the engine.

Overall, the temperature measurement makes it possible to make available precise measurement of the temperature of elements of the cylinder head assembly 10 by means of the infrared detector 28.

What is claimed is:

1. A cylinder head assembly for an internal combustion engine, having:
   a housing in which plural structural elements are arranged,
   an optical duct having a first end open into the housing, a second end external of the housing and an axis extending between the ends, the axis being aligned with at least one of the elements,
   a glass element mounted in the optical duct between the ends, the glass element being configured to seal areas of the optical duct between the glass element and the second end of the optical duct from the housing, the glass element being transparent to infrared radiation,
   an optical waveguide mounted at the second end of the optical duct and aligned to receive infrared radiation from the element that is transmitted through the glass element during operation of the internal combustion engine,
   at least one infrared detector designed to receive infrared radiation from the optical waveguide and to detect infrared radiation from the at least one element through the optical duct and through the glass fiber, and
   a control unit contacted to the at least one infrared detector and operative to determine a temperature of the at least one structural element based on the infrared radiation.

2. The cylinder head assembly of claim 1, wherein the optical duct is a linear duct.

3. The cylinder head assembly of claim 1, wherein the glass element is sapphire glass.

4. The cylinder head assembly of claim 1, further comprising an optical element assigned to the infrared detector and configured to focus the infrared radiation.

5. The cylinder head assembly of claim 4, wherein the optical element is arranged in the optical duct.

6. The cylinder head assembly of claim 1, wherein the optical duct is connected to a gas duct of the cylinder head assembly to detect the temperature of the at least one element in the gas duct.

7. The cylinder head assembly of claim 1, further comprising a cylinder, an outlet opening communicating with the cylinder, an outlet duct extending from the outlet opening and the at least one element is a valve of the cylinder head assembly, the first end of the optical duct being in the outlet duct and the axis of the optical duct being aligned with the valve for determining the temperature of the valve.

8. The cylinder head assembly of claim 1, further comprising a focusing element in the optical duct between the glass element and the second end.

9. The cylinder head assembly of claim 1, wherein the optical duct is a linear tube and has a gas-tight and fluid-tight lateral surface.

10. A method for measuring a temperature of a structural component of a cylinder head assembly of an internal combustion engine during operation of the internal combustion, comprising: detecting infrared radiation emitted from the structural component of the cylinder head assembly and transmitted through an optical duct in a housing of the cylinder head assembly during operation of the internal combustion engine, and determining the temperature of the element on the basis of the infrared radiation.

11. An internal combustion engine for a motor vehicle, having an engine block with at least one cylinder and one piston, and having the cylinder head assembly of claim 1.

* * * * *